United States Patent [19]
Lee

[11] 3,890,988
[45] June 24, 1975

[54] CLEANING ASSEMBLY FOR AUTOMOTIVE PARTS AND THE LIKE

[75] Inventor: Edward Lee, Winnipeg, Canada

[73] Assignee: Solv-X Inc., Rexdale, Canada

[22] Filed: July 13, 1973

[21] Appl. No.: 378,953

Related U.S. Application Data

[63] Continuation-in-part of Ser. No. 187,820, Oct. 8, 1971, abandoned, which is a continuation-in-part of Ser. No. 167,109, July 29, 1971, abandoned.

[52] U.S. Cl............... 134/111; 21/60.5 R; 134/10; 134/40; 134/104; 210/167
[51] Int. Cl......... B08b 3/02; B08b 3/08; C23g 5/04
[58] Field of Search ............... 134/40, 111; 99/408; 210/167, 169; 415/121 G; 417/360

[56] References Cited
UNITED STATES PATENTS

| | | | |
|---|---|---|---|
| 2,295,982 | 9/1942 | Widman | 415/121 G UX |
| 2,335,756 | 11/1943 | Haldeman | 210/169 UX |
| 2,352,356 | 6/1944 | Albertson | 134/111 |
| 2,675,012 | 4/1954 | Scales | 134/111 X |
| 3,021,235 | 2/1962 | Schumacher | 134/111 X |
| 3,522,814 | 8/1970 | Olson | 134/111 |
| 3,707,404 | 12/1972 | Carlson et al. | 134/10 |

FOREIGN PATENTS OR APPLICATIONS

| | | | |
|---|---|---|---|
| 237,844 | 5/1945 | Switzerland | 415/121 G |
| 992,076 | 6/1951 | France | 415/121 G |
| 593,294 | 10/1947 | United Kingdom | 415/121 G |

Primary Examiner—Daniel Blum
Attorney, Agent, or Firm—Stanley G. Ade

[57] ABSTRACT

A metal sink with a faucet seats over a container in which is situated a pump having a screened intake and being connected to the faucet. The pump is supported on a cone or deflector support and the contaminated solvent discharges by gravity from the sink onto the cone which spreads it circumferentially and acts as a primary separator or filter. A layer of water acts as a trap for grease and oil contaminants and the pump, which is situated in the solvent within the cone, is provided with a relatively fine screen on the intake side thereof. A plastic liner in the container permits disposal of contaminants and the like thereby eliminating undesirable discharge of the contaminants into the sewage disposal system.

8 Claims, 8 Drawing Figures

3,890,988
PATENTED JUN 24 1975
SHEET 1
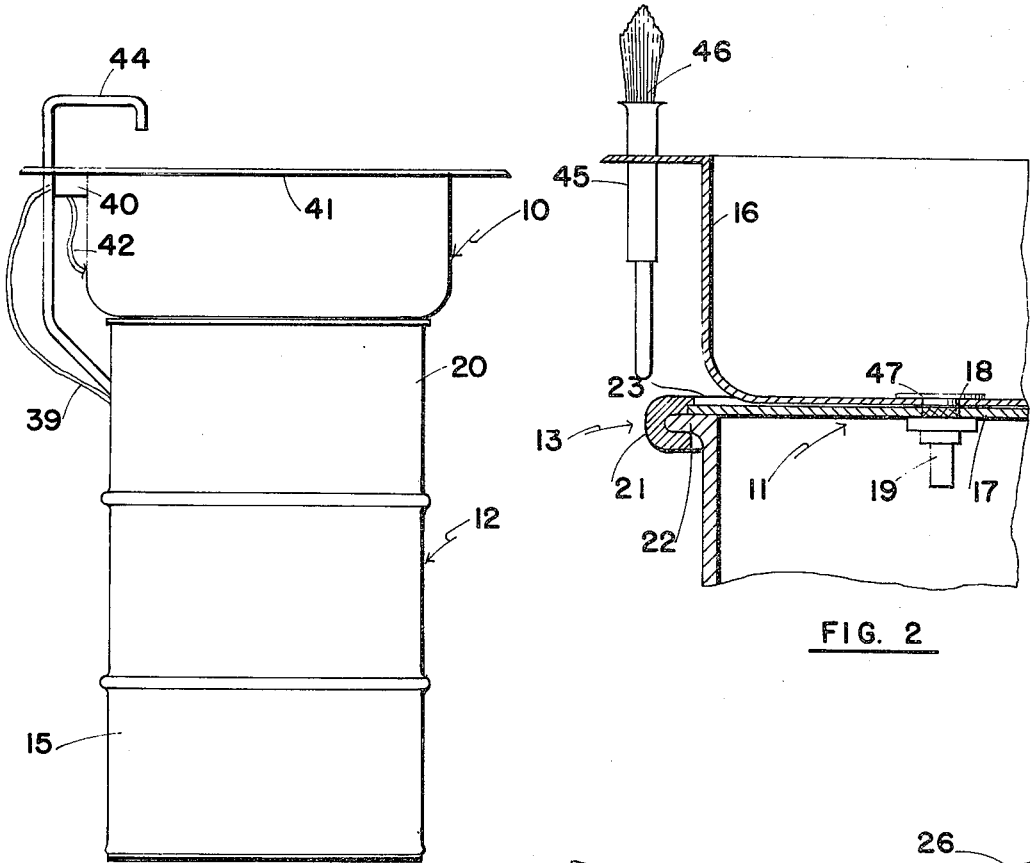
FIG. 1
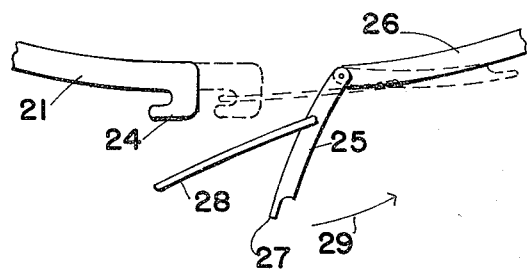
FIG. 2
FIG. 3
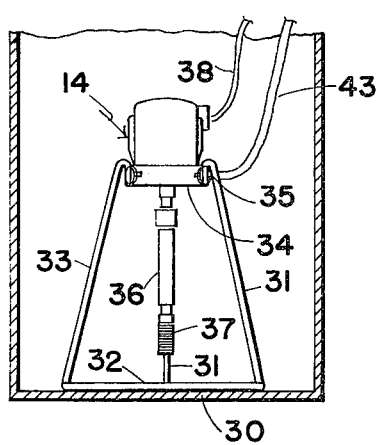
FIG. 4
INVENTOR.
BY  Edward Lee

CLEANING ASSEMBLY FOR AUTOMOTIVE PARTS AND THE LIKE

This invention constitutes a continuation-in-part application of Ser. No. 187,820, filed Oct. 8, 1971 (now abandoned), which in turn is a continuation-in-part application of Ser. No. 167,109, filed July 29, 1971 (now abandoned).

BACKGROUND OF THE INVENTION

Normally automotive parts and the like are cleaned in a receptacle in a cleaning fluid which is then either disposed of or else allowed to settle out in a container whereupon it may be used again. However, this is expensive in practice and if the cleaning fluid is allowed to settle out in a separate container, time and effort are involved in transferring the fluids from one container to the other apart from adding to storage problems and the like.

SUMMARY OF THE INVENTION

The present invention now overcomes these disadvantages by providing a receptacle adapted to seat over a container and to be detachably secured thereto. A submersible pump in the container pumps fluid to the receptacle and after use it drains back whereupon the dirt settles out by gravity so that the clean fluid can be picked up and used again, it being understood that the intake to the pump is spaced above the base of the container. A water layer is used to trap the oil and grease contaminants and retard their solution into the solvent thus extending the use time of the solvent considerably.

The principal object and essence of the invention is therefore to provide a device of the character herewithin described which is adapted to be detachably secured to a container and which includes a pump to pump the fluid from the container to the receptacle and to permit it to drain back into the container after use whereupon the dirt may settle out by gravity assisted by a primary separation and a secondary separation due to the provision of a fine screen on the pump.

Another object of the invention is to provide a device of the character herewithin described which is suitable for use with a conventional 45 gal. oil drum or the like if desired, inasmuch as means are provided to detachably clamp the receptacle to the top of an oil drum.

A still further object of the invention is to provide a device of the character herewithin described which is self contained and does not require the transfer of fluid from one container to the other as in conventional cleaners.

A further object of the invention is to provide a device of the character herewithin described which utilizes a water layer above the solvent if same is heavier than water or below the solvent if same is lighter than water in order to trap the grease and oil contaminants and retard the dissolution thereof by the solvent.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 1 is an elevation of the device situated upon an oil drum.

FIG. 2 is an enlarged fragmentary sectioned view showing the method of securing the receptacle to the container.

FIG. 3 is a fragmentary top plan view showing the method of fastening the locking ring.

FIG. 4 is a fragmentary sectional view of the base of the container showing the pump and motor combination supported upon its stand.

In the drawings like characters of reference indicate corresponding parts in the different figures.

PRELIMINARY DESCRIPTION

Figure 5:
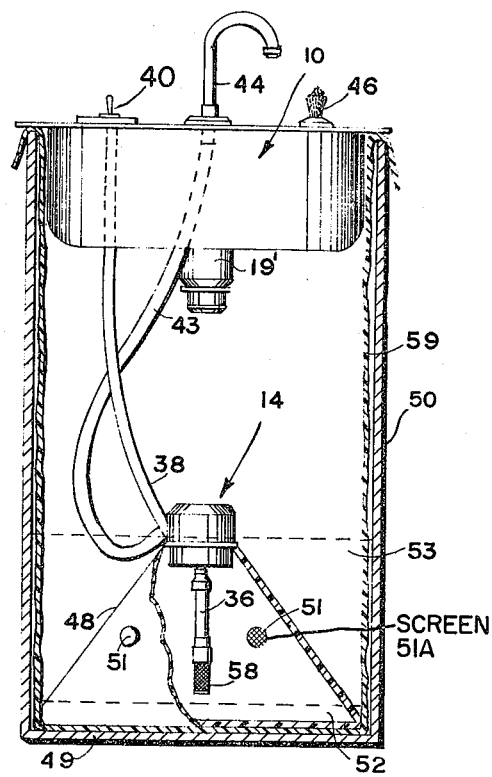
FIG. 5 is a front elevation, partially sectioned, of the preferred embodiment.

A parts cleaning receptacle 10 is secured to a support plate 11 which in turn may be engaged over the upper end of a suitable container 12 and be secured thereto by means of a locking clamp assembly 13. A pump and motor combination 14 is supported within the container with the intake being spaced from the base of the container and is operatively connected to a source of power and to the receptacle.

DETAILED DESCRIPTION

In the accompanying description and in FIGS. 1 to 4 inclusive of the drawings, the container 12 is shown as consisting of a conventional oil drum 15 but of course it will be appreciated that any suitable form of container can be used.

The receptacle 10, in this embodiment, consists of a conventional metal sink 16 which is secured by the base thereof to a circular support plate 17 which acts as a cover plate for the container 15. The conventional drain and strainer combination 18 in the base of the receptacle 16 communicates with the interior of the container via a drain assembly 19 secured to the support plate 17.

The support plate carrying the receptacle fits over the upper end 20 of the container and the clamping assembly 13 detachably holds the support plate together with the receptacle firmly in position upon the container 15. This clamping assembly includes a resilient locking ring 21, which is U-shaped in cross sectional configuration, and which engages the peripheral external bead 22 forming the upper extremity of the container and also around the periphery 23 of the support plate 17 as illustrated in FIG. 2.

FIG. 3 shows one method of locking the clamping assembly which consists of a hooked end 24 on one end of the ring 21 and an over center locking arrangement 25 pivotally secured to the other end 26 of the ring 21. The locking assembly 25 includes the main lever 27 and an elongated loop component 28 pivoted by one end thereof intermediate the end of the locking lever 27. This loop is adapted to engage over the hooked end 24 whereupon the locking lever is moved in the direction of arrow 29 until it assumes the position shown in phantom in FIG. 3 thus drawing the locking ring firmly into position and maintaining it in the closed position due to the over center relationship.

Situated within the container 15 and supported by the base 30 thereof is a stand 31 adapted to support the pump and motor combination 14.

This stand includes a circular base 32 and a tripod arrangement of legs 33 extending upwardly and inwardly from the base 32, terminating in a ring 34 which receives the pump and motor combination 14 therein. Clamping bolts 35 hold the pump and motor combination in the desired position within the stand.

This pump and motor combination includes an intake tube 36 extending downwardly therefrom including a relatively fine screened intake 37 which terminates spaced from the base 30 as clearly shown in FIG. 4.

The pump and motor combination is of course submersible and includes shielded electrical conductors 38 which extend exteriorally of the container as illustrated at 39 and communicates with a switch 40 supported by the rim 41 of the receptacle. Further electrical conduits 42 are connectable to a source of electrical power in the usual way (not illustrated).

A hose 43 also extends from the pump and motor combination 14, upwardly within the container and then extends through an aperture in the side wall adjacent the upper end 20. This connects to a discharge nozzle or outlet 44 also secured upon the rim 41 of the receptacle and adjacent this discharge nozzle or outlet is a relatively short length of tubing 45 adapted to receive and store a cleaning brush 46.

In operation, cleaning fluid (not illustrated) is held within the container and when it is desired to clean parts, a stopper 47 or the like covers the drain 18 and switch 40 operates pump and motor combination 14 thus pumping fluid from the container, through the nozzle 44 and into the receptacle.

After parts have been cleaned, the stopper 47 is removed thus allowing the contaminated fluid to drain back into the tank by gravity. Inasmuch as the majority of contaminants normally found on automotive parts and the like consist of solids, these solids settle out by gravity in the base of the container thus leaving the relatively clean cleaning fluid thereabove to be picked up by the spaced intake 37 when further use is required.

FIGS. 5 to 9 inclusive show the preferred embodiment particularly suitable for use on parts and the like contaminated with heavy grease and oil as well as dirt, grit and metal particles.

In FIG. 5 the support comprises a cone 48 resting on the base 49 of a container 50 and carrying the pump and motor 14 at the apex thereof with the intake 36 depending downwardly into the cone. Apertures 51 in the wall of the cone communicate with the remainder of the container and act as solvent intakes to the interior of the cone and these apertures may be covered by screening 51A if desired.

This cone 48 which is frusto-conical not only acts as a support for the pump and motor 14 but also as a primary separator or divider. It will be noted that the sink discharge 19' is situated immediately over the apex or upper end of the cone 48 so that contaminated solvents being discharged into the container, strikes the motor and cone which spreads this solvent radially outwardly and downwardly towards the walls of the container. This has the effect of allowing any solids to be deposited by gravity adjacent the side walls of the container, said solids being indicated in FIGS. 7 and 8 by reference character 57. Furthermore, inasmuch as the solvent enters the cone through the apertures 51, there is little danger of these solids being drawn into the interior of the cone where they might be picked up by the pump and motor assembly 14.

This enables the intake tube 36 of the pump to be provided with a relatively fine secondary filter or screen 58 without the danger of this secondary filter becoming clogged with contaminants and this screen is usually between 80 – 200 mesh size.

Furthermore, it should also be appreciated that when the pump and motor assembly is switched off, the head of solvent within the tube 43 leading to the outlet nozzle 44, permits the solvent within this tube 43 to drain back through the pump and motor assembly and out of the filter screen 58 thus cleaning any contaminants from this filter and preventing undesirable clogging from taking place.

Of importance in this application is the provision of a layer of water 52 as well as the main bulk of cleaning fluid 53 which assists in removing and trapping contaminants from the cleaning solution or solvent.

Figure 8:
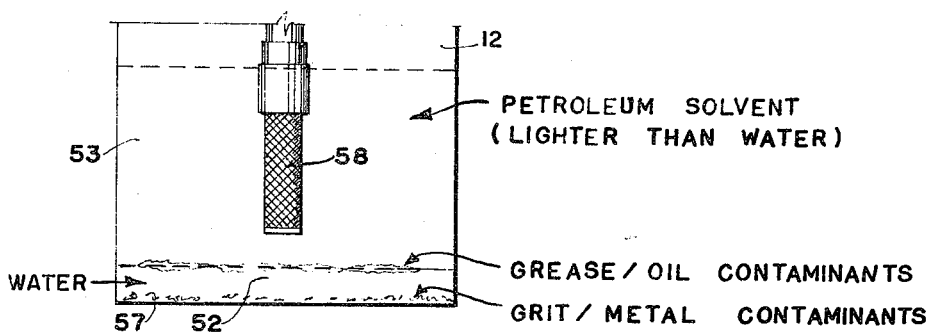
FIG. 8 is a view similar to FIG. 7 but with a petroleum or lighter than water solvent.

If the solvent being used is a petroleum based solvent then usually it is lighter than water so that it would float on the upper surface of the water as indicated in FIG. 8. However, heavy oils and greases which have been removed from parts being cleaned by the device, are trapped within the boundary layer between the water and solvent with very little surface area of these contaminants being exposed to the action of the solvent. This prevents or at least retards considerably any dissolution of these grease and oil fractions by the solvent and enables the solvent to be used for a longer period of time than is usual.

Figure 7:
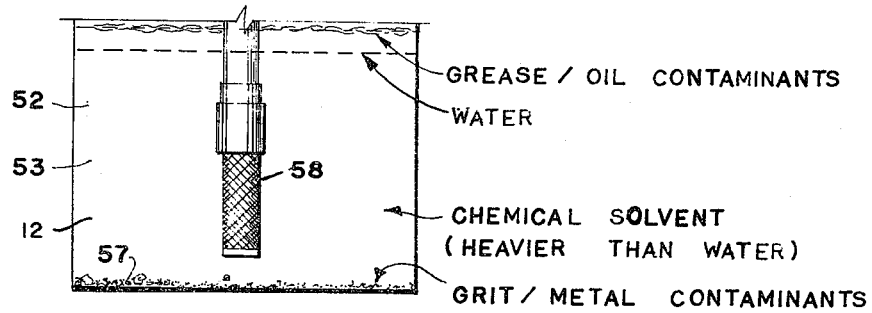
FIG. 7 is a schematic view showing the relationship of the solvent and water with a chemical or heavier than water solvent.

If, however, a chemical solvent is used, this is normally heavier than water under which circumstances the layer of water 52 will rise to the upper surface of this solvent as shown in FIG. 7. In this case, of course, the grease and oil contaminants float to the surface of the water layer and do not come into contact with the solvent at all. Therefore the only dissolution of oils and greases which might occur is during the washing action and while the contaminated solvent is being discharged from the sink and it has been found that only relatively light oils will dissolve. Once again it enables the bulk of the solvent to be used for some considerable time before it becomes contaminated.

In both instances as illustrated in FIGS. 7 and 8, it will of course be appreciated that the solvent chosen must be non-soluble in water and many commercially available solvents both petroleum and chemical are available which meet these requirements.

Figure 6:
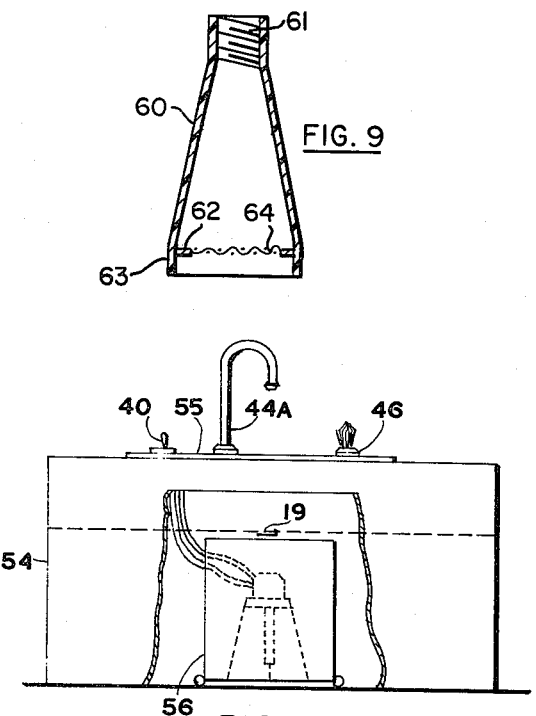
FIG. 6 is a front elevation of a modification suitable for use in a relatively large installation.

FIG. 6 shows a relatively large counter 54 having a permanent sink 55 therein. The unit 56 consists of an open tank or container on castors (not illustrated) and connected by flexible hose to the discharge nozzle 44. A pump and motor assembly and stand are situated in the container and operate as in the previous embodiments.

In the embodiment shown in FIG. 5, a plastic liner or bag 59 is provided for the container 12, said liner or bag being placed in the container first whereupon the motor and pump 14 and the support is placed on the base of the container. The sink is then placed on top of the container after filling same with the combination of solvent and water as hereinbefore described.

When it is desired to remove heavy contamination from the container, the relatively clean solvent is pumped from the container through the nozzle 44, it being observed that the lower end of the screen intake 58 is always situated within the solvent layer but spaced from the base of the container. Once the solvent has been removed for further use, the sink can be removed together with the pump and motor and its support. At this point the top of the plastic bag can be folded and tied and the water together with the contaminants and a small layer of solvent may be disposed of by regular garbage disposal facilities. By the same token if it is desired to change or renew the solvent, the old solvent can also be disposed of within the liner or plastic bag 59.

Referring back to the chemical solvent or solvent that is heavier than water, as illustrated schematically in FIG. 7, the use of this, of course, has several advantages. First and foremost, the majority of chemical solvents are non-flammable or at least are provided with a relatively high flash point thus making them safe for use in the majority of commercial environments. Secondly, because of the provision of the water layer above the solvent, evaporation is reduced to the minimum thus reducing the amount of topping up which might be required.

When filling the container with a heavier than water solvent such as a chemical solvent, this is poured in first to the approximate level shown and then the relatively thin layer of water is poured in, care being taken to avoid undue turbulence.

It should also be noted that the cone type separator reduces considerably any turbulence within the container which of course facilitates the separation and trapping of the contaminants by the water layer.

When a lighter than water solvent such as a petroleum solvent is used, the layer of water is poured first and then the main bulk of the solvent. Once again care should be taken to ensure that the water is not agitated to the extent that it enters the cone through the holes 51. However, even if some water enters the apertures in the cone, it will float or sink depending upon the solvent used and will not affect the function of the device adversely providing water is not present at the pump inlet.

Figure 9:
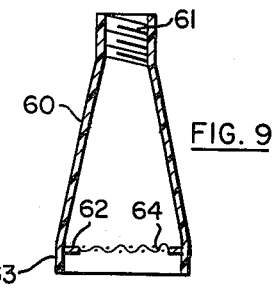
FIG. 9 is an enlarged cross sectional view of one embodiment of the secondary filter element per se.

FIG. 9 shows the preferred embodiment of the secondary filter at the pump inlet and is identified by reference character 60.

It consists of a frusto-conical cone preferably made of plastic and having a screw threaded upper end 61 which enables it to be engaged upon the lower end of the pump intake specifically designated 36A in FIG. 7.

A frusto-conical cone 60 is hollow and is provided with an interior flange 62 extending inwardly and spaced from the lower end 63 and a relatively fine screen 64 is secured to this flange and spans the area defined by the flange as clearly illustrated.

The conical shape of the portion 60 assists in deflecting any fine particulate matter which may have entered the apertures 51 of the conical support 48, and prevents them from being drawn into the pump through the relatively fine screen 64.

It should be stressed that the primary separator taking the form of the cone 48 deflects the particulate matter towards the walls of the container thus enabling a relatively fine screen to be used on the pump intake without any danger of this screen becoming clogged. This permits practically clean solvent to be recirculated by the pump.

In other words the novelty of the primary cone separator 48 in conjunction with the secondary filter is that it makes it possible to use a secondary filter with a fine screen without danger of it becoming clogged thereby achieving good positive filtration with a permanent filter and without the use of disposable filters. Without the cone deflector or primary separator, a pump filter with a relatively fine mesh will become clogged within seconds.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A cleaning assembly for machine parts and the like comprising in combination a container, a parts cleaning receptacle situated on the upper side of said container, nozzle means in said receptacle, and a drain in said receptacle discharging into said container, a pump and pump motor in said container operatively connected to said nozzle means, a pump intake on said pump, means to support said pump and pump motor, said pump intake being spaced from the base of said container, primary separator means in said container and relatively fine secondary filter means on said pump intake, said means to support said pump and pump motor also constituting said primary separator means, said primary separator means receiving solvent from said drain and directing said solvent towards the outer walls of said container, said primary separator means and said means to support said pump and pump motor comprising a frusto-conical support supported on the base of said container, said pump and said pump motor engaging within the open apex of said conical support, and solvent intake means formed in the walls of said conical support, the apex of said conical support being situated vertically below said fluid discharge drain.

2. The device according to claim 1 in which said secondary filter means on said pump intake includes a frusto-conical body portion secured by one end thereof to said pump intake and a screen across the other end of said body portion.

3. The device according to claim 2 in which said screen is spaced inwardly from said other end and spans the interior of said body portion.

4. In a cleaning assembly for machine parts and the like which includes a container, a parts cleaning receptacle situated on the upper side of said container, nozzle means in said receptacle and a drain in said receptacle discharging into said container, a pump and pump motor in said container operatively connected to said nozzle means and a pump intake on said pump; means to support said pump and pump motor, said pump intake being spaced from the base of said container, primary separator means in said container and relatively fine secondary filter means on said pump intake, said means to support said pump and pump motor also constituting said primary separator means, said primary separator means receiving solvent from said drain and directing said solvent to adjacent the outer walls of said container, said primary separator means and said means to support said pump and pump motor comprising a frusto-conical support supported on the base of said container, said pump and pump motor engaging within the open apex of said conical support, and solvent intake means formed in the walls of said conical support.

5. The device according to claim 4 in which said secondary filter means on said pump intake includes a frusto-conical body portion secured by one end thereof to said pump intake and a screen across the other end of said body portion.

6. In a cleaning assembly for machine parts and the like which includes a parts cleaning receptacle, an upright container adapted to hold liquid, upon which said receptacle engages, outlet means discharging into said receptacle, drain means in said receptacle connecting with said container and a pump and pump motor in said container operatively connected to said outlet means; the improvement which is characterised by the combination of a primary separator in said container receiving solvent from said drain and directing said solvent to adjacent the outer walls of said container, secondary filter means on the intake of said pump, a body of non-water-soluble solvent in said container, and a contaminant trapping water layer within said container but spaced from said intake, one of said body of solvent and water layers floating on the other, said primary separator taking the form of a frusto-conical support for said pump and motor means, said pump and motor means being situated within the upper open apex of said conical support, and solvent intake means formed in the walls of said support intermediate the ends thereof, the apex of said conical support being situated vertically below the drain means in said receptacle.

7. The device according to claim 6 in which the specific gravity of said body of solvent is less than the specific gravity of water.

8. The device according to claim 6 in which the specific gravity of said body of solvent is greater than the specific gravity of water.

* * * * *